Feb. 23, 1932.    G. SUNDBACK    1,846,921

SEPARABLE FASTENER LOCKING MEMBER

Filed July 11, 1929

INVENTOR.
Gideon Sundback
BY
ATTORNEY

Patented Feb. 23, 1932

1,846,921

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

SEPARABLE FASTENER LOCKING MEMBER

Original application filed August 2, 1926, Serial No. 126,539. Divided and this application filed July 11, 1929. Serial No. 377,362.

This invention relates to separable fastener locking members of the type disclosed in my copending application Serial No. 126,539, filed August 2, 1926, of which this application is a division, and is directed principally to improvements upon the bent wire locking members disclosed in my copending application Serial No. 735,574, filed September 3, 1924, of which this application is a continuation in part.

The object of the invention is to increase the strength and holding power of bent wire locking members, to reduce their weight and bulk, and to construct such members of less metal and in fewer forming operations than heretofore, with substantial savings in cost.

The locking members disclosed in my application Serial No. 735,574, filed September 3, 1924, are made of ordinary wire of round or other cross-section cut off to the desired length, bent to U-shape, deformed at the bend to provide locking surfaces, and having the legs formed to clamp the members on the corded stringer. These locking members are uniformly strong and durable in use, are lighter than previous locking members of equal strength, and are cheaper to produce because they require fewer forming operations and leave less waste than heretofore. For certain uses, however, bent wire locking members of uniform cross-section have insufficient material to supply the desired stiffness to hold upon the stringer, and insufficient material at the bend to permit locking surfaces of the desired configuration to be formed from the material available. This is particularly true in the case of fasteners applied to women's apparel where the tendency to light weight is pronounced. If such locking members are made strong enough to withstand continued hard usage their weight becomes objectionable and can be reduced only by impairing strength and holding power.

The present invention provides a special construction of wire locking members which are formed by die operations from intermediately thickened straight material ready for compression upon the tape. To attach such member to the tape the intermediate thickened portion is bent to U-shape and the narrow jaw portions compressed or wrapped around the corded edge. This construction provides sufficient material at the bend to form the desired interlocking surfaces and holding power while reducing the size and weight of the locking members and consequently the over-all weight of the fastener.

The invention will be described in connection with the accompanying drawings, in which.

Figure 1:
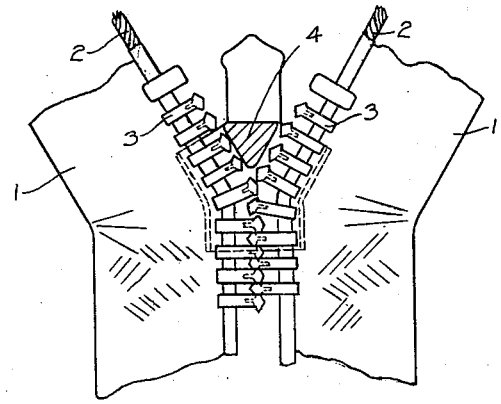
Fig. 1 shows one embodiment of my invention in a partially closed fastener.

In Fig. 1, the stringers 1, which may be of woven tape, have twisted or braided cords 2 either enclosed in the fold of the tape or sewed to opposite sides thereof. A plurality of locking members 3 are mounted in staggered relation on the edges of the stringers and are adapted to be engaged and disengaged by the up and down movement of the slider 4, which may be of any suitable construction.

Figure 2:
Fig. 2 is a plan view of the specially formed wire blank from which the locking members of Fig. 1 are formed.

The locking members 3 are formed from wire blanks cut to the desired length, having a thickening central portion 5 and enlarged ends 6, as shown in Fig. 2. These blanks are preferably formed by rolling or pressing, or else by upsetting the central portion 5 and ends 6 to the required size. The portions 5 and 6 provide the necessary thickness of metal to withstand the forming and bending operations subsequently to be performed.

Figure 3:
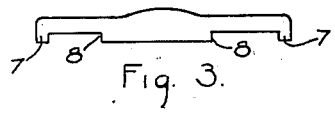
Fig. 3 shows the blank of Fig. 2 after the first forming operation.
Figure 4:
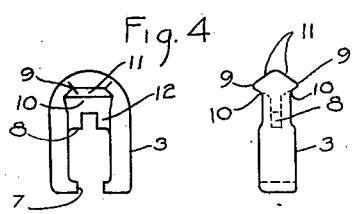
Fig. 4 is a front view of the blank shown in Fig. 3.
Figures 5, 6:
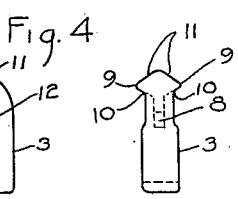
Fig. 5 is a plan view of the finished locking member.
Fig. 6 is a side view of the locking member shown in Fig. 5.

The blank is next formed between dies which flatten and reduce the ends and turn them in at 7 to form jaws for clamping to the tape, and also form the central thickened portion 5 to provide shoulders 8, as shown in Figs. 3 and 4. When the blank is bent to U-shape, as shown in Figs. 5 and 6, the shoulders 8 serve as stops which abut against the corded edge of the stringer and prevent it from bulging into the interlocking portions at the bend of the U, and aid in securing the locking member on the stringer.

The die operation which forms the interlocking surfaces on the intermediate thickened portion of the blank preferably occurs before bending the blank to U-shape, but may occur after bending if desired. This operation consists of deforming the intermediate thickened portion to provide projections 9 substantially in the shape of an arrowhead, as shown in Fig. 6, each projection having an interlocking surface 10 on the inner side, that is, the side adjacent the corded edge of the stringer, and an inclined guiding surface 11 on the outer side, leading to the interlocking surface, which slidingly guide the member into engagement with similar locking members on the opposite stringer.

The interlocking portion is also recessed to form a socket 12 between each projection 9 and the corded edge of the stringer, in which an opposite locking member may be received and held by the inner inclined interlocking surface 10, as shown in Fig. 1. The shoulders 8 not only serve as stop surfaces to prevent the corded edge of the stringer from bulging into the socket 12 when clamped upon the stringer, but also limit the depth of reception of the projection 9 of an opposite locking member within the socket.

The thickened central portion 5 of the blank provides enough metal to form the interlocking projection and socket portions described above and to permit bending to U-shape without danger of cracking or weakening the metal. At the same time the reduced end or jaw portions require less metal than heretofore and enable the total weight of the locking member to reduce without impairing the strength or holding power.

Figures 7, 8:
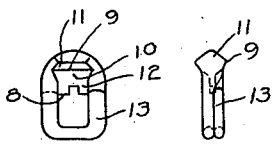
Fig. 7 is a plan view of a modified form of locking member having overlapping clamping jaws.
Fig. 8 is a side view of the locking member shown in Fig. 7.

In Figs. 7 and 8 the interlocking portions are the same as in Figs. 5 and 6, but the clamping jaws are adapted to be overlapped and wrapped around the corded edge of the stringer. In this form of the invention the free ends 13 are elongated and are preferably reduced in cross-section to not more than half the thickness of the central portion 5 of the blank. These reduced end portions are then bent around the corded edge of the stringer to form two substantially right angles bent in opposite directions so that they overlap and occupy a space no greater than that occupied by the arrow-shaped projections 9. These locking members may be attached to the stringer by passing the ends or jaws through the fabric behind the corded edge, and then bending and wrapping the jaws around the cord, but another preferred method of mounting will be described below in connection with Fig. 12.

Figure 9:
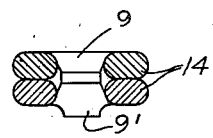
Fig. 9 is a section taken on the line 9—9 of Fig. 10.
Figure 10:
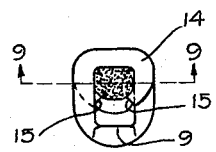
Fig. 10 is a plan view showing another modification of the invention.
Figure 11:
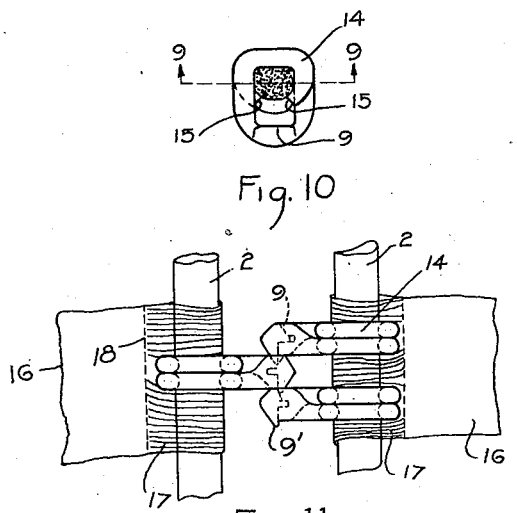
Fig. 11 shows the locking members of Fig. 10 mounted on stringers.

In Figs. 9 to 11 the locking members have interlocking portions shaped somewhat like the projection and socket portions of Figs. 5 and 6, except that one projection 9' is larger than the opposite projection 9. The blank from which this locking member is formed is like that shown in Fig. 5 except that the ends are elongated and reduced to substantially half the thickness of the central portion 5 to permit them to be wrapped around the corded edge as in Figs. 7 and 8. The end portions 14 of the jaws instead of being round, as in the previous forms, are flattened to the desired depth, the flattening permitting the desired overlapping and increasing the resistance to spreading. The extreme ends 15 of the locking member are turned in and pressed against the corded edge of the tape, thereby preventing the corded edge from bulging into the recess or socket portion. Having the jaws of reduced thickness and of the cross-sectional shape illustrated permits a slight bulging out of the corded edge of the tape between the top and bottom halves of the jaws, thus making the clamping action more secure and with less likelihood of longitudinal displacement of the member on the stringer. Having the jaws flattened as illustrated does not increase the dimension of the locking member longitudinally of the stringer and does not lessen the spacing between the locking members or reduce the flexibility of the fastener. If desired, jaws of the shape shown in Figs. 9 to 11 may be provided with interlocking portions of other shapes.

Figure 12:
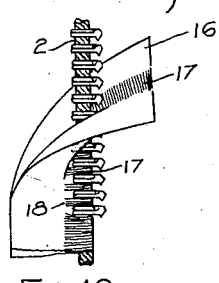
Fig. 12 shows one way of attaching the locking members to the stringers.

Fig. 12 illustrates the preferred manner of attaching the locking members of Figs. 7 to 11 upon the tape. In this construction the locking members are first clamped upon the cord 2. The stringer 16 preferably consists of woven tape folded over, with certain warp threads pulled out or omitted at the fold, leaving only the weft threads 17. The locking members, previously mounted on the cord 2, are then pushed through the weft threads 17 so that they project out of the fabric. The tape is then folded over and the plies stitched together at 18 to form a strong unitary stringer with the parts locked firmly in place.

Among the advantages of this invention may be enumerated the increased strength and holding power resulting from thickening the blank prior to forming and bending. Another result from the same structure is increased stiffness in the jaws to aid in holding the member on the tape. The straight wire blank is cheaper than specially formed blanks generally employed in the art, and does not require annealing or special care in handling. Having the jaws overlap increases the holding power on the tape and lessens any possibility of the jaws spreading under crosswise stress on the material. When the jaws are flattened increased holding power is obtained without impairing the flexibility of the fastener, and reducing the thickness of the jaws longitudinally of the tape also lessens their tendency to spread and increases their stiffness.

I claim:

1. A separable fastener locking member comprising a strip of material having an intermediate thickened portion bent to U-shape, said intermediate thickened portion deformed to provide a substantially arrow-shaped head.

2. In a separable fastener, a flexible stringer, a locking member mounted on said stringer comprising a strip of material bent to U-shape with the bent portion of said strip which projects from the stringer formed relatively thicker transversely of the stringer than the end portions of said strip which engage the stringer, interlocking recesses inwardly of the bend and projections formed by swaging up the metal from said thickened portion to interlock with the recesses of cooperating fastener elements.

3. A method of forming a separable fastener locking member comprising forming a strip of material with a relatively thick central portion and flattened end portions on opposite sides of the central portion, bending said strip at said central thickened portion, and later swaging the material of the thick portion to form interlocking projections and recesses.

4. The method of forming a separable fastener locking member comprising forming a strip of material with a central relatively thick portion and flattened thinner portions on opposite sides of the central portion, said central portion having one flat side, bending said strip to U-shape with said flat side disposed on the inner side of the bend, and then forming interlocking projections and recesses from the material of said thick portion adjacent the bend.

Signed at Meadville, in the county of Crawford and State of Pennsylvania, this 19th day of June, A. D. 1929.

GIDEON SUNDBACK.